United States Patent
Kotzin

(10) Patent No.: US 8,532,611 B2
(45) Date of Patent: *Sep. 10, 2013

(54) METHOD AND APPARATUS FOR ENABLING AND REWARDING WIRELESS RESOURCE SHARING

(75) Inventor: Michael D. Kotzin, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1187 days.

This patent is subject to a terminal disclaimer.

(21) Appl. No.: 11/426,452

(22) Filed: Jun. 26, 2006

(65) Prior Publication Data
US 2007/0026857 A1 Feb. 1, 2007

Related U.S. Application Data

(62) Division of application No. 09/921,392, filed on Aug. 2, 2001, now Pat. No. 7,113,771.

(51) Int. Cl.
*H04M 11/00* (2006.01)
(52) U.S. Cl.
USPC ............. 455/406; 455/414.1; 455/552.1; 455/403
(58) Field of Classification Search
USPC ............. 455/406, 414.1, 552.1, 403
See application file for complete search history.

(56) References Cited

U.S. PATENT DOCUMENTS

| | | | | |
|---|---|---|---|---|
| 5,684,801 A | * | 11/1997 | Amitay et al. | 370/447 |
| 5,894,472 A | * | 4/1999 | de Seze | 370/337 |
| 6,115,615 A | * | 9/2000 | Ota et al. | 455/422.1 |
| 6,137,784 A | * | 10/2000 | Wallerius et al. | 370/328 |
| 6,646,987 B1 | * | 11/2003 | Qaddoura | 370/231 |
| 6,659,947 B1 | * | 12/2003 | Carter et al. | 600/300 |
| 6,665,308 B1 | * | 12/2003 | Rakib et al. | 370/441 |
| 6,751,468 B1 | * | 6/2004 | Heubel et al. | 455/518 |
| 6,832,242 B2 | * | 12/2004 | Keskar | 709/204 |
| 6,982,962 B1 | * | 1/2006 | Lunsford et al. | 370/278 |
| 7,113,771 B2 | * | 9/2006 | Kotzin | 455/414.1 |
| 2001/0033248 A1 | * | 10/2001 | Owechko | 342/371 |

* cited by examiner

*Primary Examiner* — Nghi H Ly

(57) ABSTRACT

A method and apparatus determines whether a wireless apparatus (106a) that is operative to communicate over both a wireless wide area network (104) and a wireless local area network (102), will allow shared use of its short range wireless resources, such as LAN radio frequency bandwidth, optical bandwidth or other local area wireless resources, with other proximal wireless units (106b-106n) in the wireless local area network (102). In addition, the method and apparatus generated reward data (116) to provide a reward, such as free telephone calls, account credits, price reductions, or other rewards, so that a billing system is updated when a wireless apparatus (106a-106n) has been designated as allowing shared use of its wireless resources by other proximal wireless units.

15 Claims, 9 Drawing Sheets

METHOD AND APPARATUS FOR ENABLING AND REWARDING WIRELESS RESOURCE SHARING

FIELD OF THE INVENTION

The invention relates generally to methods and apparatus that provide communication over both a wireless wide area network (WAN) and a wireless local area network (LAN), and more particularly to methods and apparatus that provide rewards for users of a system that allow sharing of wireless resources with other proximal wireless units in a wireless local area network.

BACKGROUND OF THE INVENTION

Wireless communication units, such as radiotelephones, Internet appliances, personal digital assistants and other apparatus may communicate over a wide area network, such as a wireless cellular system or over a wireless link to an Internet point of presence. In addition, such wireless communication apparatus may additionally have a short-range wireless transceiver to allow wireless communication with other local subscriber apparatus that are close to one another, such as other proximal wireless units. For example, Internet appliances may include a local area network communication mechanisms, such as a BlueTooth™ based transceiver, short range optical transceiver, or other short range transceiver that allows communication with other wireless units via a local area network. For example, piconets are known that allow short-range communication with other subscriber units. Generally, the wireless air interface between a wireless communication unit and the wide area network and other local subscriber apparatus will be different. For example, common standardized cellular air interfaces include GSM, IS-95, IS-136 etc. Wireless LAN air interfaces include such things as Blue Tooth, 802.11, Hiperlan, etc. It is understood however, that a single common air interface in a subscriber unit can simultaneously provide a connection to a wide area network (such as the internet via a point of presence) and other local subscriber units.

There have been proposals to provide communication range extensions by, for example, having a first subscriber receive information designated for a destination subscriber if the first subscriber can receive the information. The first subscriber receives the information for a destination subscriber and passes it to the destination subscriber while the first subscriber can receive the information. This may be suitable, for example, if the destination subscriber cannot receive the destination signal due to a low power level. Accordingly, another subscriber apparatus that is able to receive the information is sent the information for the destination unit and retransmits the information to the destination unit. However, such proposals typically require only one of the subscriber units of a group of neighboring or proximal units to be designated as the unit that retransmits the information to the destination wireless unit. Accordingly, information thruput is not significantly enhanced.

Moreover, although the sharing of the wireless resources of subscriber apparatuses may have its advantages, battery energy may run down when it is used to retransmit information for a different destination subscriber unit. Hence, users may resist or be unwilling to participate in sharing wireless resources.

Accordingly, a need exists for a method and apparatus that allows shared resource usage of wireless resources for apparatus that may communicate with a wide area network and a local area network to enhance participation by potential wireless apparatuses. A need further exists for a method and apparatus that allows aggregation of shared resource usage of wireless resources for apparatus that may communicate with a wide area network and a local area network to enhance the information throughput.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which reference numerals identify like elements, in which:

DETAILED DESCRIPTION OF A PREFERRED EMBODIMENT OF THE INVENTION

Figure 1:
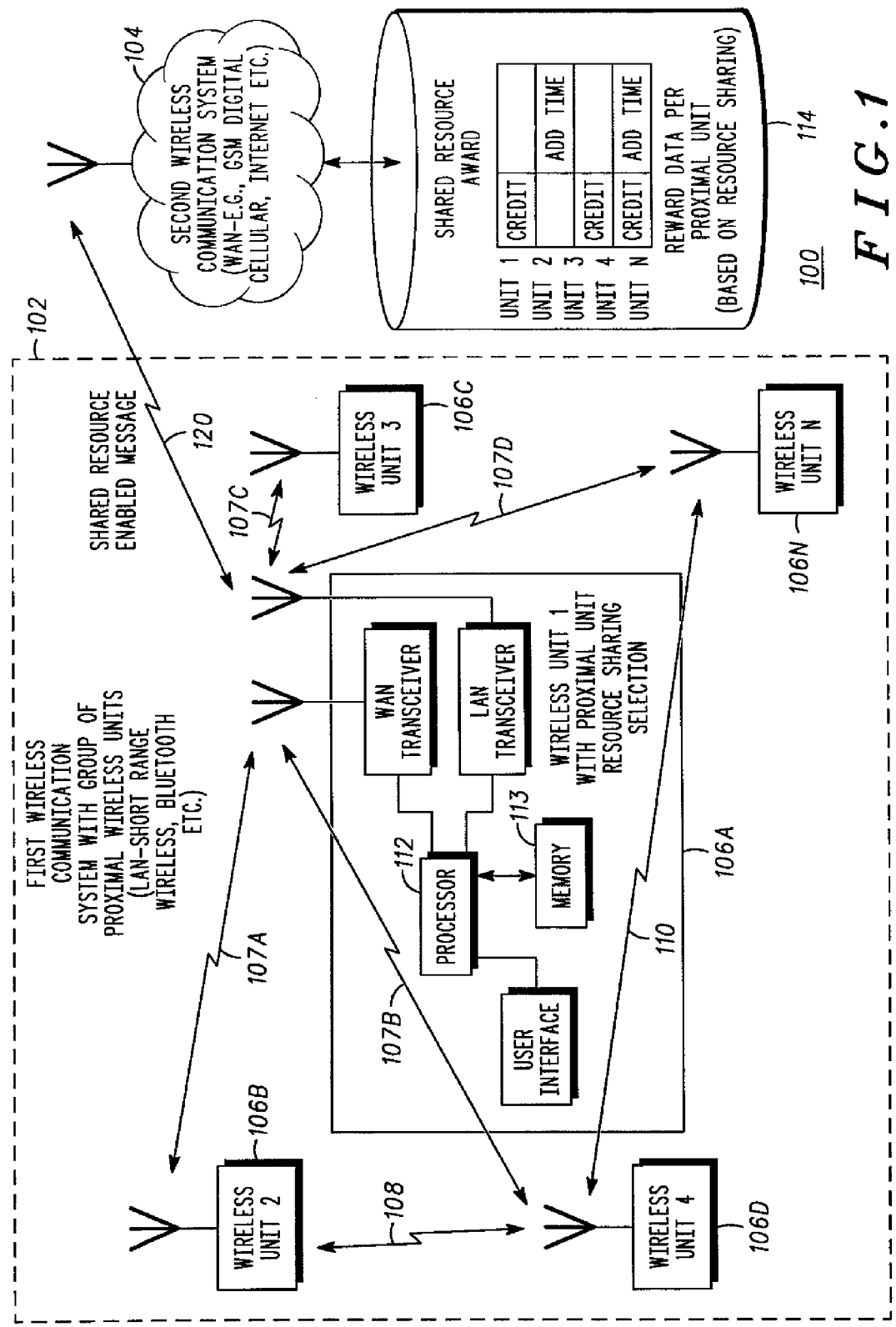
FIG. 1 is a block diagram illustrating one example of a system for communicating information in accordance with one embodiment of the invention.

A method and apparatus allows for and determines whether a wireless apparatus that is operative to communicate over different wireless networks will allow shared use of its wireless resources by other proximal units. In one example, different wireless networks include both a wireless wide area network and a wireless local area network, wherein the wireless apparatus allows shared use of its wireless resources with other proximal wireless units in the wireless local area network. In another embodiment, shared use of wide area network resources is provided. As used herein, wireless resources include wireless communication channels between the device and the wide area network. In addition, the method and apparatus generates reward data to provide a reward, such as free telephone calls, account credits, price reductions, or other rewards, so that a billing system is updated when a wireless apparatus has been enabled as allowing shared use of its wireless resources by other proximal wireless units. Accordingly, a wireless apparatus can allow aggregation of its wireless resources capabilities with other proximal wireless units to enhance throughput with a wide area network. A wireless apparatus sends knowledge of the fact that the wireless apparatus will participate in sharing its wireless resources (such as LAN wireless resources) with a group of proximal wireless units by communicating information to, for example, a network operator server or base station associated with the wireless wide area network.

In one embodiment, the method includes presenting a user input interface having a selection menu to generate data representing whether a user desires to participate in allowing a wireless apparatus share its wireless resources with other proximal wireless unit. For example, a user may be provided a choice in a set-up menu that asks if the user wishes to allow sharing of its local area network wireless resources with neighboring units. If the user selects yes, the wireless apparatus enables location discovery by other peer proximal wireless units and sharing protocols to allow range extension and or resource sharing on the wireless apparatus. By way of example, and not limitation, a message is sent by the wireless apparatus to a wireless wide area network unit indicating that the user is allowing resource sharing by the wireless unit. The network operator rewards the user by updating the user billing information to provide a reward for the decision to share its wireless resources with other local area wireless apparatus.

Enabling the wireless apparatus to share its wireless resources includes, for example, the enabling messaging so that the wireless apparatus may communicate as necessary with other proximal wireless units in a local area network to allow use of its wireless resources by other proximal wireless units. Accordingly, the method includes discovering the proximal wireless units in response to determining that a wireless apparatus is designated as a shared wireless resource. Accordingly, a peer-to-peer communication technique is used to allow the plurality of proximal wireless units to use each other's short range wireless communication resources for a given communication session including a data transmission session, voice or audio transmission session, or any other information as desired.

FIG. 1 is a block diagram illustrating a communication system 100 that includes a wireless local area network (LAN) communication system 102, such as a short range wireless communication system compliant, for example, with the Bluetooth™ standard, or any other suitable short range communication protocol including, but not limited to, 802.11 or optical communication protocols. The communication system 100 also includes a wireless wide area network (WAN) communication system 104 such as a digital cellular communication system, the Internet, or any other suitable communication system. The wireless local area network communication system 102 includes a plurality of wireless units 106a-106n, such as an Internet appliance, radiotelephone appliance, including, but not limited to, hand held apparatus, laptop computers, desk top computers, or any other suitable wireless communication apparatus. Each of the wireless units 106a-106n, in this embodiment, includes both a wireless local area network communication transceiver, such as a Bluetooth™-based transceiver, and a wireless wide area network transceiver, such as a CDMA cellular transceiver. Each of the wireless units communicates in a peer-to-peer arrangement with each other using the wireless local area network communication transceivers, but also communicates individually with the wireless wide area network communication system 104. As illustrated, wireless units 106b-106n are operative to communicate using a wireless local area network protocol with wireless unit 106a via wireless LAN communication links 107a-107d. Wireless unit 106b and wireless unit 106d are in close enough proximity to allow communication between these two apparatus as shown by communication link 108. Similarly, wireless unit 106d and wireless unit 106n are also in close enough proximity to allow wireless local area network communication as illustrated by communication link 110. However, as shown, wireless unit 106c is not within an acceptable proximity with wireless unit 106n to allow short-range communication between these two apparatus. Also as shown, wireless unit 106a is in communication with the wireless wide area network 104 via link 120.

In this example, wireless unit 106a includes a processing apparatus 112, such as a digital signal processor, microprocessor, discrete logic or any other suitable circuitry that provides the proximal unit resource sharing selection. For example, the processing apparatus 112 may execute instructions that are stored in a memory 113 that cause the processing apparatus 112 to, among other things, determine whether the wireless apparatus 106a will allow shared use of its wireless local area network wireless resources with proximal wireless units 106b-106n. It will be recognized that the sharing of the local area network wireless resources may occur in both an uplink and downlink direction. For example, the wireless unit 106a, if it has available bandwidth, may communicate information destined for wireless unit 106c as communicated over link 120 by the wide area network 104 to the wireless unit 106a. In a reverse direction, if the wireless unit 106c does not have enough available bandwidth to communicate all of its information directly with the wide area network 104, the wireless unit 106c may communicate information destined for the wireless wide area network 104 to the wireless unit 106a which may then transmit the information to the wide area network 104 on behalf of the wireless unit 106c. In this example, the wide area network 104 will then combine the information received from all wireless units on behalf of a common wireless unit to receive an entire communication.

For purposes of illustration, however, the disclosed method and apparatus will first be described from a downlink perspective such that the wide area network 104 is attempting to send information to one of the wireless units 106a-106n wherein the destination wireless unit does not have sufficient bandwidth to receive all of the information that is to be sent by the wireless wide area network 104.

The wireless wide area network communication system 104, in an illustrative example, includes a digital radiotelephone system that includes, for example, a plurality of base stations that are networked as known in the art. A system operator has access to a subscriber database 114 via a network unit such as a server. In one embodiment, the network unit includes a billing system that updates a database 114 that includes reward data 116 on a per proximal wireless unit basis. For example, each wireless unit in the wireless local area network that has agreed to allow sharing of its local area network wireless resources is assigned reward data 116 to compensate the users of the wireless units for participating in the aggregation which increases the efficiency of the operator's system.

Figure 2:
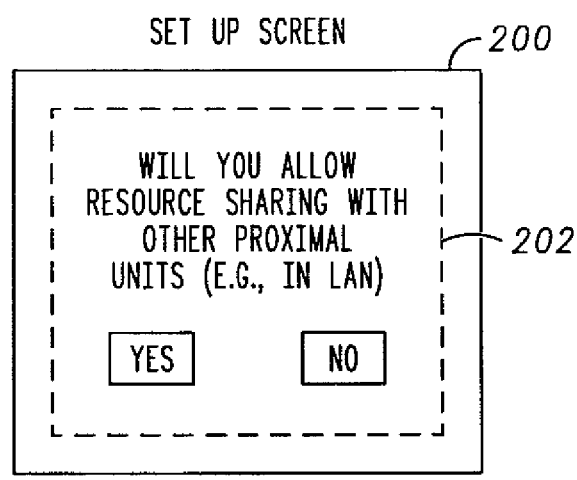
FIG. 2 is a graphical illustration of a setup menu to allow wireless resource sharing in accordance with one embodiment of the invention.

Referring to FIGS. 1 and 2, the processing apparatus 112 is operatively coupled to a suitable interface apparatus, such as a display screen, keypad, voice recognition apparatus, or any other suitable input apparatus. In the preferred example, the processing apparatus 112 is suitably coupled to a display apparatus to allow the processing apparatus to provide a set up screen 200 which presents a user input interface having a selection menu 202 to generate data representing that a user desires to participate in allowing the wireless apparatus to share its wireless local area wireless resources with other proximal wireless units. In this example, a set up screen 200 is provided which includes the question, "Will you allow resource sharing with other proximal units?". The user selects the "yes" or "no" button, which then generates a signal to the processing apparatus 112 indicating whether a user selected "yes" or "no". This represents the data indicating whether the user desires to participate in allowing the wireless apparatus to share its wireless resources. If the user selects "yes", the processing apparatus 112 enables the wireless apparatus 106*a* to share its wireless resource. This is done by the processing apparatus receiving data representing that the "yes" button has been selected. The processing apparatus 112 causes a message 120 to be generated indicating that the wireless apparatus 106*a* is allowing shared use of its wireless resources by proximal wireless units 106*b*-106*n*. Memory 113 is operatively coupled to processor 112 and includes executable instructions that when executed by the processing device 112 causes the processing device 112 to, among other things, receive the data indicating whether the user desires to participate in allowing a wireless apparatus to share its wireless resources with proximal wireless units. In addition, the processing device generates a shared resource enabled message over link 120 for the wireless wide area network 104 indicating whether the wireless apparatus 106*a* will allow shared use of its local area network wireless resources with proximal wireless units. In addition, the processing device 112 enables the wireless apparatus to share its local area network wireless resources in response to the data that indicates that the user desires to participate in allowing the wireless apparatus to share its wireless resources. It will be recognized, however, that instead of the processing device 112 executing instructions, any suitable hardware, combination of hardware, software and firmware may be utilized as desired. Accordingly, the processing device 112 may control other circuits or processing devices to perform the operations set forth herein. For example, the processing device 112 controls the presentation of the user input interface to present the selection menu 202. The processing device 112 also controls locating the proximal wireless units that are in the local area network in response to determining that the wireless apparatus 106*a* is designated as a shared wireless resource.

The wireless wide area network system 104 generates a user record for the wireless unit 106*a* identifying the type of reward that is provided in response to enabling the wireless apparatus 106*a* to act as a shared wireless resource. This is done in response to receiving the shared resource enabled message over link 120. For example, a network operating system may update the data base 114 with the reward data 116 for the particular wireless unit, namely wireless unit 106*a*, in this example, to reward the associated user with discounts, price reductions, free calls, added time, credits, or any other suitable update of the billing system to reward for allowing the shared use of the wireless apparatus resources.

In addition to sending the shared resource enabled message 120, the wireless unit 106 also broadcasts or otherwise provides, through peer-to-peer communication protocols, as known in the art, a message for one or more proximal units in the wireless local area network communication system 102 indicating an amount of bandwidth that the wireless apparatus 106*a* can share with proximal wireless units 106*b*-106*n*. In this way, each of the wireless units that are in range of the wireless unit 106*a* is made aware of the amount of wireless bandwidth that it is willing to share to allow communication with the wireless wide area network 104. Accordingly, if a wireless unit, such as wireless unit 106*d*, wishes to send large amounts of data while also having a telephone call, but does not have the necessary bandwidth to perform both operations, data (or voice) may be communicated to the wide area network 104 via the wireless unit 106*a* on behalf of the wireless unit 106*d*.

Providing the reward for allowing shared use of the wireless apparatus shared resources may include at least one of providing a credit amount to an associated user account, providing free use of wireless channels, providing a reduced price structure for the user, or any other suitable reward to entice subscribers to allow aggregation of their local area network resources for communication with the wide area network communication system. Providing the reward includes updating a subscriber billing system in response to enabling the shared resource feature.

Figure 3:
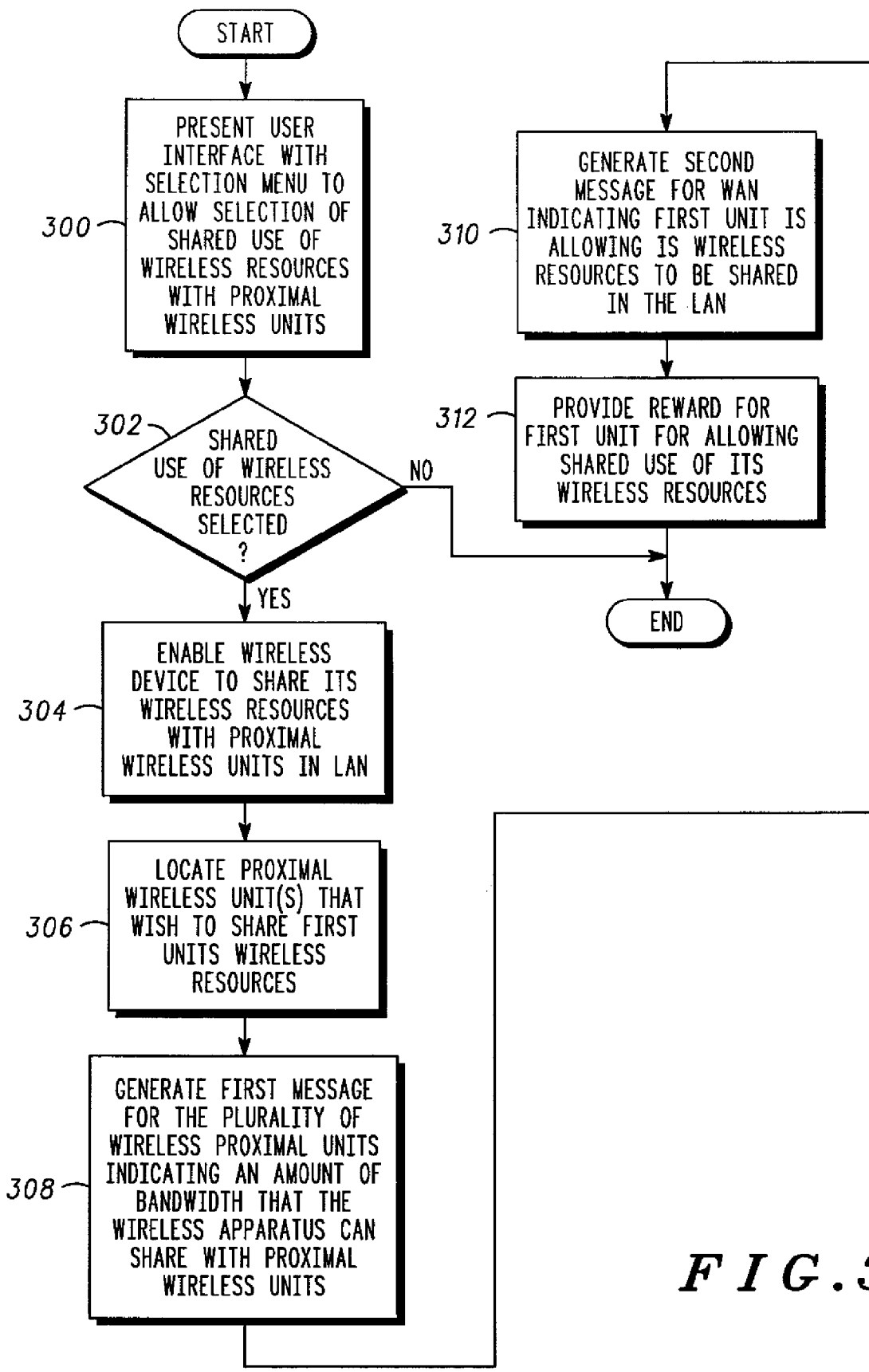
FIG. 3 is a flow chart illustrating one method for communicating information in accordance with one embodiment of the invention.

FIG. 3 is a flow chart illustrating one method of communication in accordance with one embodiment of the invention. As shown in block 300, the method includes presenting, by the processing apparatus for example, a user interface with a selection menu to allow selection of shared use of wireless local area network resources with other proximal wireless units. As shown in block 302, the method includes determining whether the wireless apparatus will allow shared use of its resources with proximal wireless units. If the user interface generates data representing that the user desires to participate in allowing the wireless apparatus to share its wireless local area network resources with other proximal wireless units, the method includes, as shown in block 304, enabling the wireless apparatus to share its short-range wireless resources with other proximal wireless units in the local area network. This is done, for example, by enabling the discovery of the wireless apparatus by other proximal wireless apparatuses through conventional peer to peer signaling or other suitable technique, and enabling the shared resource coordination protocol using the short range adjunct channel to allow the proximal users to communicate with the wireless apparatus that has agreed to share its short range or wireless local area network wireless resources with other proximal wireless units.

As shown in block 306, the method includes discovering the proximal wireless units that wish to share the first wireless unit's wireless resources in response to determining that the wireless apparatus is designated as a shared wireless resources. This may be done, for example, by the wireless apparatus sending query messages to all peers in the wireless local area network to determine which other wireless units are within range of the wireless apparatus that is designated as a shared wireless resource. This may be done using any conventional peer-to-peer protocols. As shown in block 308, the method includes generating, by the wireless unit, for example, a message for the plurality of wireless proximal units indicating an amount of bandwidth that the wireless unit can share with proximal wireless units. This provides the additional bandwidth, for example, that may be used by other wireless units if the other wireless units within proximity wish to use the shared resources of the wireless unit. As shown in block 310, the wireless unit also generates a message for the wireless wide area network indicating that the wireless unit is allowing its short-range wireless resources to be shared in the local area network. As shown in block 312, the method includes providing, such as by a network element, a reward for the wireless unit for allowing shared use of its wireless local area network resources. Accordingly, the reward data is generated, for example, in a billing system indicating that the wireless unit should obtain a reward for allowing other proximal wireless units to use its wireless resources.

It will be recognized that the local area network communication may be an optical local area network as well as a radio frequency-based local area network or any other suitable or any other suitable wireless LAN. In this example, the wireless local area network has a communication range of less than one hundred meters, but may be any suitable short-range local area network as desired.

It will also be recognized that any or all of the devices might be able to receive the downlink information from the wide area system. However, some device might be better suited for communication with the wide area network. Maintaining the wide area communication with that unit better suited than the others, which subsequently relays the information to one or more proximal units, may allow improved efficiency of the wide area network-which is usually the more cost sensitive system. For example, when considering a case where one unit is situated by a window and has a clear line of sight to a base station, the base station can utilize less power to communicate to that unit and thereby create less interference to the wide area network system improving its overall capacity.

It is also understood that the wide area communication to the individual subscriber units might not be from the same wide area system. For example, one system may be a CDMA system to access an enterprise database, while another system may utilize a GSM system. It will be recognized that protocols can be in place to allow the desired connection between a subscriber and a WAN, even if the subscriber does not have the capability to access a particular WAN. A user's network might not even have coverage or license for the area a user is in, yet service can still be provided.

Figure 4:
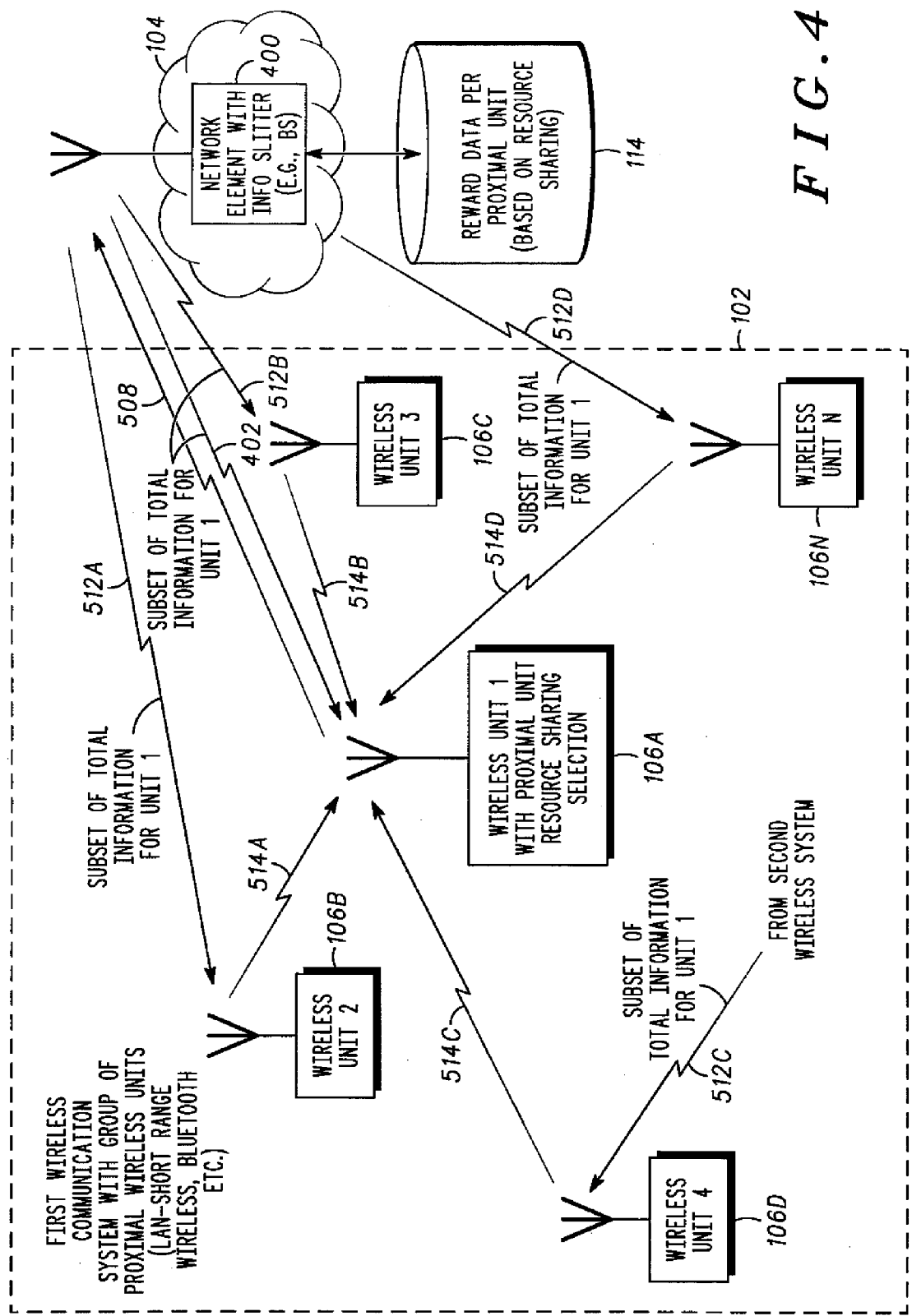
FIG. 4 is a block diagram illustrating a communication system wherein proximal wireless units that have indicated allowance of shared wireless resources, communicate subsets of information for a destination wireless unit in a wireless LAN as received from a wireless wide area network, in accordance with one embodiment of the invention.

FIG. 4 is a block diagram illustrating a downlink communication in which a network element 400, such as a cellular base station (BS), Internet Web server, or any other suitable unit within the second wireless communication system 104, splits (i.e., distributes) a communication destined for the wireless apparatus 106a, which is information to be communicated for the wireless apparatus 106a, when the wireless apparatus 106a indicates that it does not have sufficient bandwidth but that other proximal units within the short range local area network 102 will receive portions of the communication on behalf of the destination wireless apparatus 106a. Accordingly, the system shown in FIG. 4 increases system capacity and operational performance by aggregating the capabilities of several independent wireless apparatus 106b-106n. Accordingly, the group of independent wireless apparatus 106a-106n are identified and coordinated using the short-range communication system 102. The independent apparatus become part of an aggregated group that can be used for beneficial purposes. For example, if wireless apparatus 106a decides that it wants to download a very large file from the WAN 104, the information destined for the wireless apparatus 106a is distributed among the independent members of the aggregated group. It will be recognized that the wireless apparatus 106a-106n may be subscriber radios on completely different WAN systems. In such an example, the coordination with a distribution of the information may be handled by one or more network elements from each of the differing systems using a coordinating entity in the network. In addition, some of the wireless apparatus 106a-106n may not experience the same quality of communication with the wide area network 104. Accordingly, a wireless apparatus in the group of proximal units that is located in a more optimal location (e.g., near window) is used to carry a larger burden of the traffic for the group. This quality information (e.g., signal strength) may be determined by the network element 400 (one or more) or by the wireless apparatus themselves using conventional signal quality detection techniques. The resulting link quality information is then provided to other members of the group of proximal units via peer-to-peer communication and results are communicated with the wide area network to increase efficiency in maintaining an acceptable level of quality of service.

Figure 5:
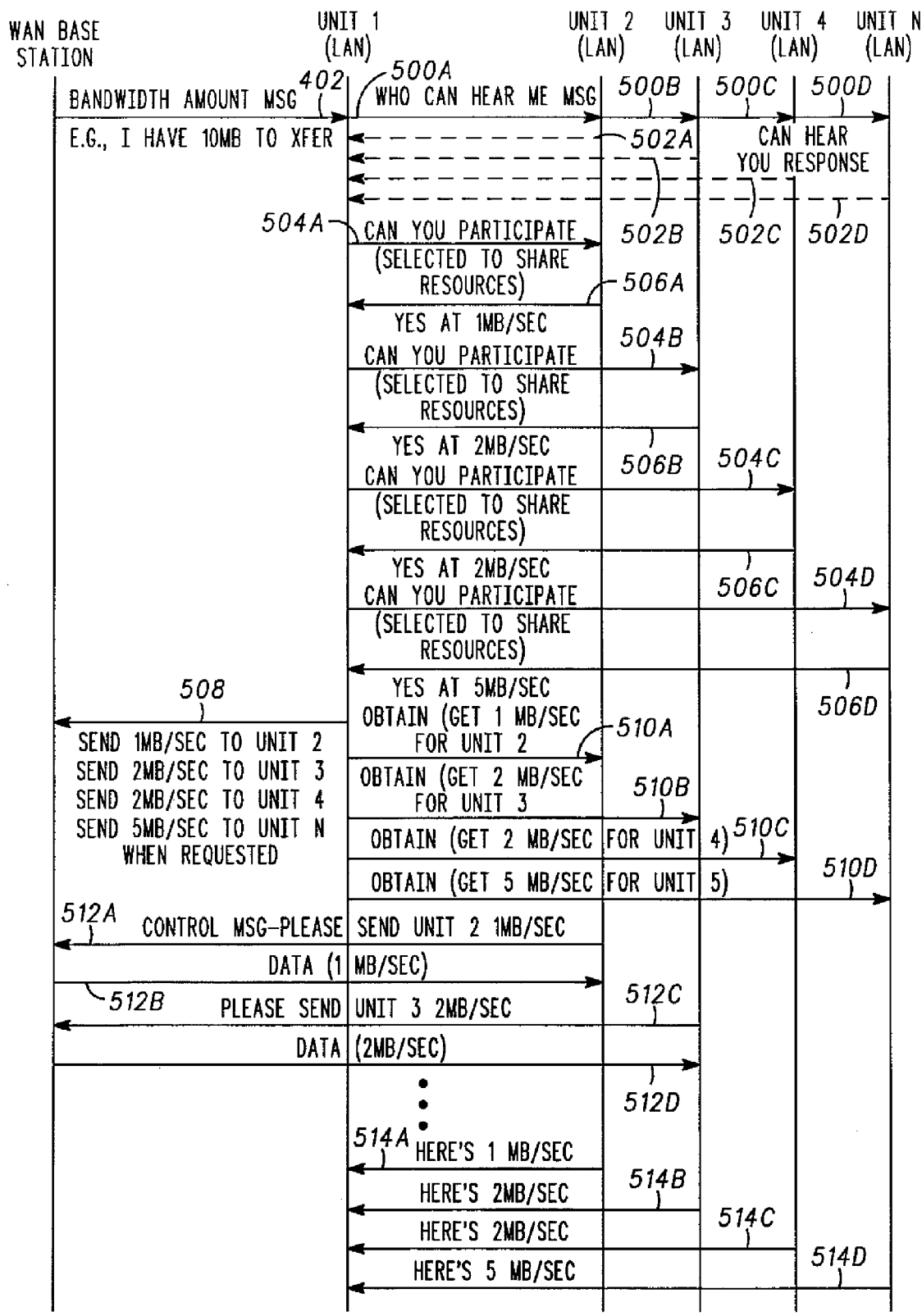
FIG. 5 is a diagram illustrating messaging between a wide area network and proximal units within a local area unit in accordance with one embodiment of the invention.
Figure 6:
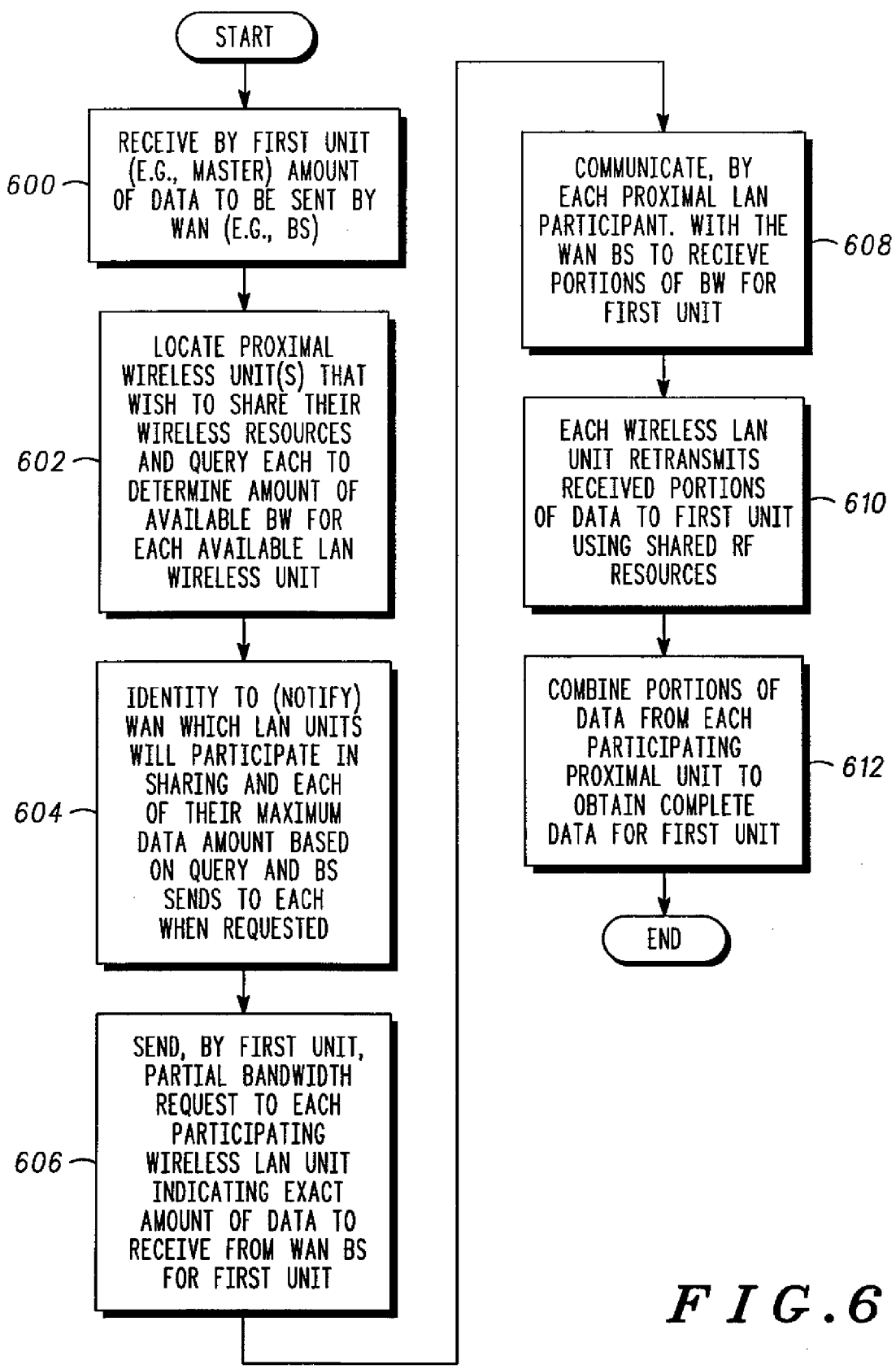
FIG. 6 is a flow chart illustrating a method of communication in accordance with one embodiment of the invention.

Referring to FIGS. 4-6, and by way of illustration and not limitation, one example of discovery and coordination protocol will be described with reference a downlink communication. In this example, the wireless apparatus 106a is the destination unit within the wireless local area network 102. However, since it has insufficient bandwidth to receive the entire communication from the wide area network, other wireless apparatus 106b-106n that have agreed to participate to share their short range wireless resources, are used to retransmit portions of the communication that have been split by the wide area network 104 for distribution among the participating proximal wireless apparatus.

In operation, the network element 400 receives a message in the form of data indicating an amount of data (i.e. voice, non-voice etc.) to be sent via the wide area network 104 for the wireless apparatus 106a. This is shown as message 402. In this example, the network element 400 informs wireless apparatus 106a that it has ten megabits of information to transfer. In response to receiving the data indicating the amount of data to be sent via the wide area network, the wireless apparatus 106a carries out local communication via the wireless short range communication system to determine which of the wireless apparatus 106b-106n is within range of the wireless unit 106a. In other words, the wireless apparatus 106a sends query messages via a broadcast message or individually via a peer-to-peer communication to determine which proximal wireless units in the LAN can hear the query message from the LAN wireless apparatus 106a. The query messages are indicated as messages 500a-500d. Responses to the query messages 500a-500d from each of the wireless units are shown as responses 502a-502d. In this example, all of the wireless units 106b-106n are within range of the wireless apparatus 106a and are therefore considered proximal wireless units in the local area network. Once the wireless apparatus 106a has located other proximal wireless units, the wireless apparatus 106a sends additional shared resource participation queries 504a-504d to each of the wireless apparatus 106b-106n to determine which of these units has been selected by its user to participate in sharing their short range wireless resources with other proximal wireless units.

In this example, each of the wireless apparatus 106b-106n have been designated as units that will participate in allowing shared use of their short-range wireless resources. Accordingly, each of the proximal wireless units responds by indicating to the wireless apparatus 106a that they will allow shared use of their resources and can participate in the communication. In addition, each of the proximal units in the group indicates the amount of wireless resources that they are willing to allocate to this particular communication or session. For example, participation response messages 506a-506d indicate the number of megabits per second that each proximal wireless apparatus is capable of providing by sharing some of its wireless resources. The wireless apparatus 106a accumulates the information, for example, in memory 113 or any other suitable location.

Accordingly, as shown in block 600 of FIG. 6, a method of communication includes receiving, for example, by the wireless apparatus 106a, an amount of data to be sent by the wide area network via, for example, the bandwidth message 402. As shown in block 602, the method includes locating the proximal wireless units that wish to share their wireless resources and query each of them to determine the amount of available bandwidth for each available local area wireless unit that is considered a proximal wireless unit. These operations are performed, for example, by the messages 500-506. As shown in block 604, the method includes identifying to the wide area network which local area network units, namely which proximal wireless apparatus, will participate in sharing of the resources. This is done, for example, by sending a bandwidth distribution message 508 which notifies the wide area network which of the plurality of proximal wireless units will participate in sharing the wireless resources for use in facilitating communication with the wireless apparatus 106a. This message may include, for example, the maximum bandwidth that was provided by each of the proximal wireless units in response to the query by the wireless apparatus 106a. In this example, the distribution message 508 indicates that one megabit per second can be sent to the wireless apparatus 106b, two megabits per second can be sent to wireless apparatus 106c, two megabits per second can be sent to wireless apparatus 106d, and five megabits per second can be sent to wireless apparatus 106n. Thus, in a period of about ten seconds or less, the destination unit can receive the total message of ten megabits. Of course, the wireless apparatus 106a itself may also participate in receive a portion of the message destined for it.

As shown in block 606, the method includes sending, by the wireless apparatus 106a for example, to each of the participating proximal wireless units, a partial bandwidth request indicating an amount of data to be received by a party from the wide area network. The partial bandwidth requests are indicated as partial bandwidth requests 510a-510d. In response thereto, each of the proximal wireless units communicates via a control message or any other suitable scheme, with the wide area network to receive the portion of the bandwidth of the communication that is destined for the wireless apparatus 106a. Both communications are represented by messages 512a-512d. In addition, the network element 400 responds by transmitting to each of the participating wireless units, subsets of the total information destined for the wireless apparatus 106a. In other words, each of the participating wireless units 106b-106n receives portions of a communication destined for the wireless apparatus 106a. These are also shown by messages 512a-512d. When each of the participating proximal wireless units receives their respective subsets of the total information for the destination unit (i.e., wireless apparatus 106a), each of the units then retransmits the respective portions of the communication to the wireless apparatus 106a as shown by messages 514a-514d. Accordingly, the plurality of proximal units conveys the split information to the wireless apparatus 106a. It will be recognized that at least some of the transmitted split information is conveyed but preferably all of the information is conveyed. The network element 400, such as a cellular base station or any other suitable network element, transmits the split information indicated as the subset of total information which is identified by a destination proximal unit. This communication assumes that the network element 400 is in communication via a WAN with each of the proximal wireless units 106b-106n in the group.

Accordingly, as shown in block 608, the method includes communicating, by each particularly proximal local area network wireless apparatus, with the wireless wide area network via the control message 512a-512d to receive differing portions of the bandwidth for the destination apparatus. As shown in block 610, the method includes retransmitting by each of the participating proximal wireless units the portions of data that were split by the wide area network and distributed to each of the independent proximal wireless units, to the wireless apparatus 106a using their shared short range wireless resources. As shown in block 612, the wireless apparatus 106a may directly combine portions of the data from each of the participating proximal units to obtain the complete data stream or message. In an alternative embodiment, a different wireless apparatus may combine the differing messages if desired and then send a complete message to the destination unit. Optionally, the wireless apparatus 106a, can direct the WAN BS in message 508 as to how to split the portions of message so that apparatus 106a knows how to combine the message 514a-d from the proximal units.

Figure 7:
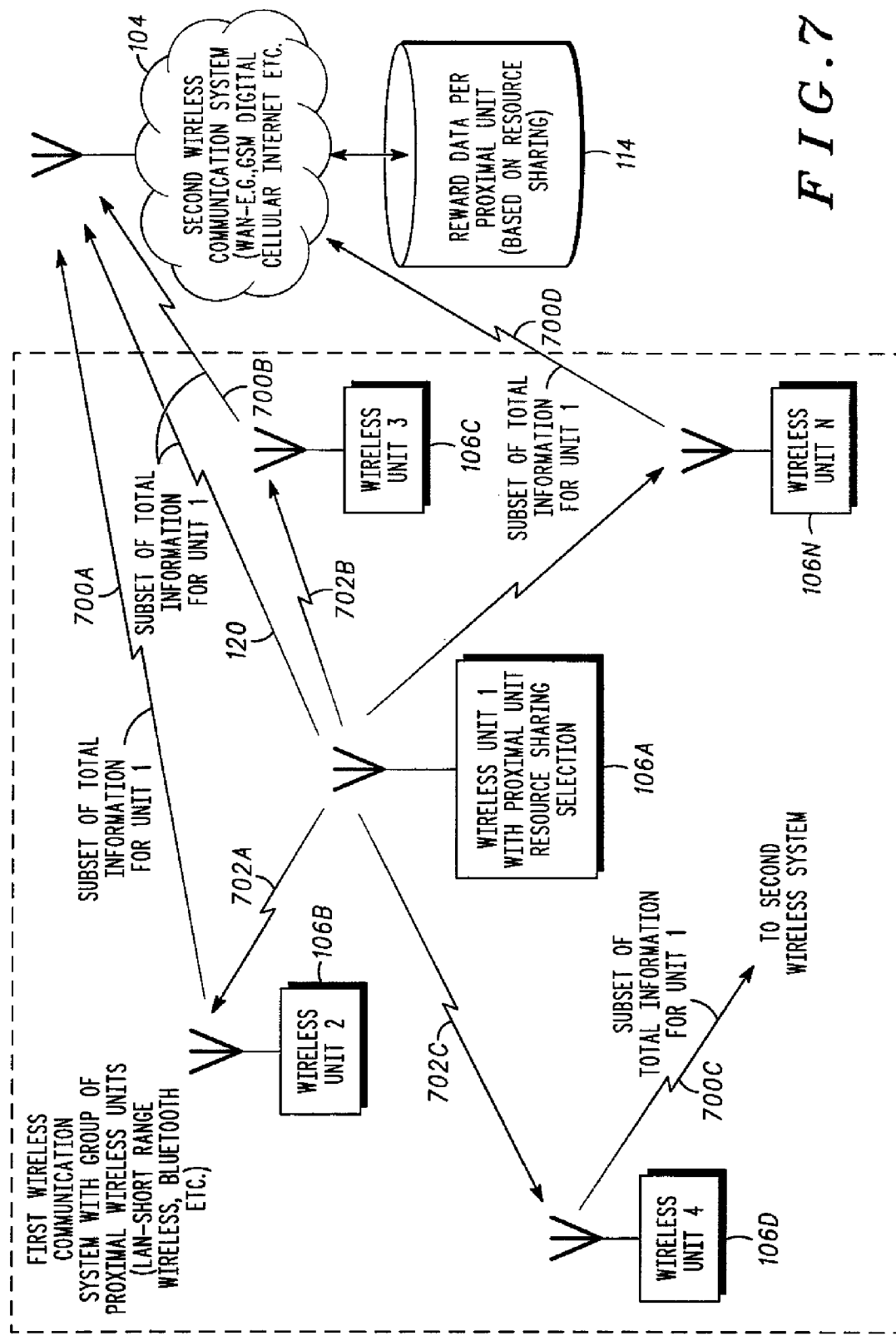
FIG. 7 is a block diagram illustrating a communication system wherein proximal wireless units that have indicated allowance of shared wireless resources, communicate subsets of information from a source wireless unit in a wireless LAN for a wireless wide area network, in accordance with one embodiment of the invention.

FIG. 7 illustrates a similar operation but in the uplink direction wherein a message originated by a wireless apparatus in the local area network splits the information to be communicated to the wide area network wireless communications system. The same LAN unit location steps may be carried out as described above. Once the wireless apparatus 106a has determined which of the wireless units in the local area network are proximal wireless units that have allowed sharing of their wireless resources, the wireless unit suitably splits the information that is destined for the wide area network among the wireless resources of the participating wireless apparatus. Once the information is divided and distributed based on the bandwidth availability of each of the participating units, the wireless apparatus 106a transmits the split information to the plurality of participating proximal wireless units in the group. Each of the plurality of proximal wireless units then retransmits or conveys at least some of the transmitted split information to the wide area network as shown by messages 700a-700d. The wide area network 104 then receives the conveyed information and combines the conveyed split information as needed to obtain the entire communication as originated from the wireless apparatus 106a. Accordingly, the wireless apparatus 106a sends each of the participating wireless units portions of a communication indicated as 702a-702d, associated with the wireless apparatus 106a that is destined for the wide area network. This information is then retransmitted as shown by messages 700a-700d. The messages 700a-700d may also contain information for appropriate recombination. With knowledge of which information is placed on each wide area channel, it is naturally possible to reconstruct the entire message in the network. Of course, the wireless unit 106a itself may directly transmit a portion of the message over link 120.

In addition, if desired, the proximal wireless units as noted above may determine a signal quality level associated with the wide area network and provide the signal quality level to the wireless apparatus 106a wherein the wireless apparatus 106a then uses the proximal wireless unit with the best signal quality to provide the most bandwidth for the communication. Conversely, during a downlink communication, the wireless area network may obtain the signal strength level, either from messages that it receives or from queries to the proximal wireless apparatus and attempt to split the communication such that a majority of the information is sent to the wireless units with the higher signal quality levels. Accordingly, a signal quality level distribution scheme is provided for communication of information for a single unit by using a plurality of proximal wireless apparatus.

Alternatively, sharing of wide area wireless resources among proximal units may be provided. For example, a user interface provides selectable enabling by a user of whether the wireless apparatus will allow shared use of its wireless resources with proximal wireless units in a wide area network. For example, the proximal wireless units may communicate with each other via one or more different wireless wide area networks. When the apparatus is so enabled, the processor allows shared use of wireless resources, by the wireless apparatus, in response to the selected enablement of shared use. Hence wide area and local area wireless resources may be shared depending upon a desired application.

Figure 8:
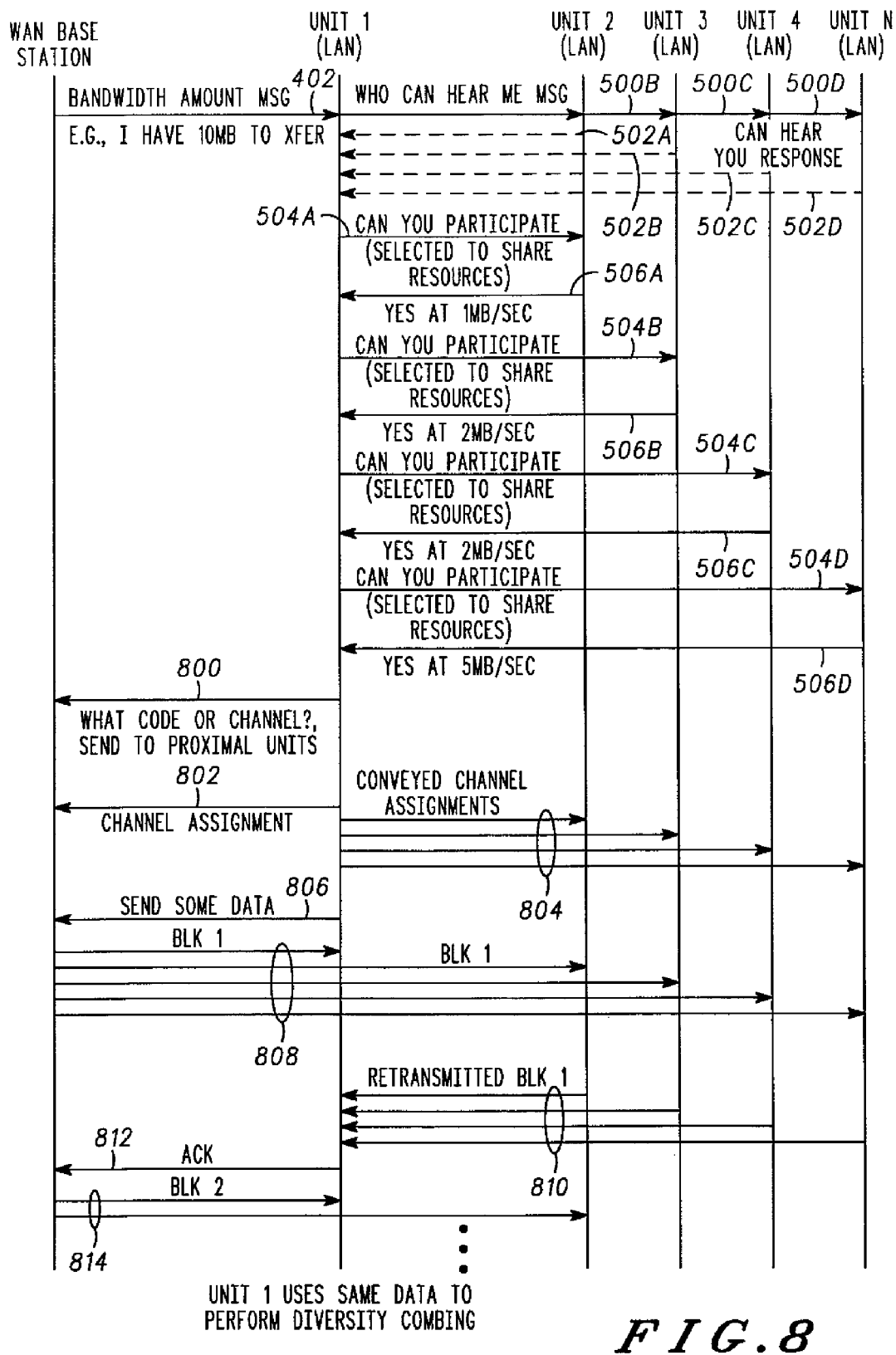
FIG. 8 is a diagram illustrating messaging between a wide area network and proximal units within a local area unit to facilitate diversity combining, in accordance with one embodiment of the invention.

FIG. 8 illustrates a signaling diagram of an alternative embodiment of the disclosed invention that exploits several wireless devices together, to improve signal reception via a type of diversity combining. The signaling diagram illustrates a method for communicating information for a destination wireless apparatus, such as wireless apparatus 106a (unit 1), in a downlink communication. In this embodiment, the group of independent wireless apparatus 106a-106n are identified and coordinated (aggregated) using a short-range wireless area network (wireless LAN). Each wireless apparatus receives information from the wireless wide area network such as a conventional cellular system. Accordingly, at least one (or plurality of) additional proximal wireless apparatus 106b-106n receives the same information that is ultimately destined for one of the wireless apparatus (e.g., 106a) in the local area network. The destination, unit 106a, may or may not actually be able to receive any information from the wide area network. This preferred embodiment assumes that it is able to receive at least some of the wide area information. Each wireless apparatus 106b-106n that has received the same information from the wide area network then forwards information based on what was received (e.g. a retransmission of soft received information, which, decoded alone would generate numerous received errors) to the destination wireless apparatus 106a via the short-range wireless LAN. The destination wireless apparatus 106a accordingly receives at least some additional forwarded information, such as copies of the information or a subset that allows generation of the information, and combines the multiple available received signals—potentially some of its own—to improve reliability of detection of the original wide area transmitted signal. Hence, a destination wireless apparatus in the local area network may use known signal combining techniques such as switch diversity combining, maximal ratio diversity combining, or any other suitable diversity combining techniques as desired. Accordingly, a plurality of wireless apparatus and local area network receive the same information from a wide area network and forward signals based on the reception, using the short-range wireless communication system, to a destination wireless apparatus in the local area network. The destination unit optimally combines the information, potentially with its own received information, to improve its reliability of detection.

Figure 9:
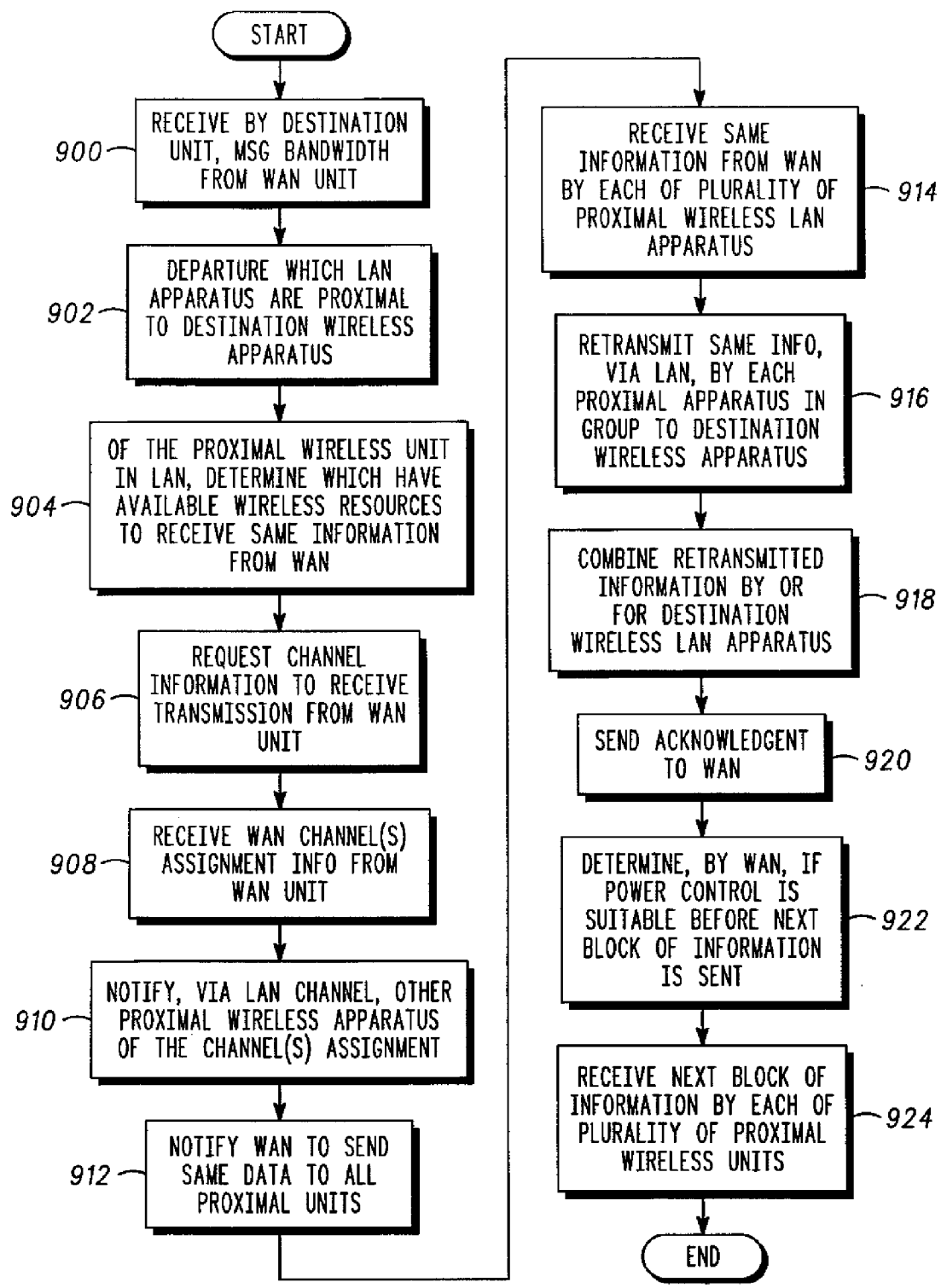
FIG. 9 is a flow chart illustrating another method of communication, in accordance with one embodiment of the invention.

Referring to FIGS. 8 and 9, a method for communicating information for a destination wireless apparatus that is operative to communicate in a wireless local area network and also operative to communicate in a wireless wide area network will be described. As shown in block 900, the method includes receiving, by the destination wireless apparatus, such as unit 1, a message indicating the wide area's system desiring to transfer data traffic to the destination unit and the amount of bandwidth. As shown in block 902, the method includes determining which local area network wireless apparatus are proximal to the destination wireless apparatus via signaling 504a through 506d. As shown in block 904, this includes determining which of the proximal wireless units in the local area network have available wireless resources to receive the traffic data that will be sent to the destination unit from the wide area network.

As shown in block 906, the method includes, requesting, by the destination wireless apparatus, a request to the available proximal units to receive the wide area information and to forward it to the destination. Included in the request is channel information indicating the channel that will be used by the wide area network and received by each of the proximal wireless apparatus in the local area network that will participate in the diversity communication. Accordingly, the same wide area signal is received simultaneously by the destination and the proximal units. The proximal units forward information to the destination unit using the local area wireless link, such as soft receiver demodulator information and a measure of signal quality, so that the destination unit can optimally utilize one or more forwarded information, in conjunction with its own, to enhance reception of the wide are transmitted signal.

As shown in block 908, the method includes the wide area network base station sending a channel assignment message 802 back to the destination wireless apparatus which assigns the channel for traffic data to be sent. As shown in block 910, the method includes notifying, via a short range wireless local area network channel, by the destination wireless apparatus for example, the channel assignments designated by the wireless area network to each of the proximal wireless apparatus. The conveyance of the channel assignment is shown as channel assignment signaling 804. Once each of the identified proximal wireless apparatus in the local area network have been assigned the proper channel to receive the message from the wireless area network element, such as the base station, the method includes the destination wireless apparatus sending a notification message 806 via a wide area network channel such as a control channel or other suitable channel, to notify the wide area network to send the data, namely the information, to all participating proximal wireless apparatus, as shown in block 912.

In response to the notification request 806, the wireless area network base station transmits the information that is destined for the destination wireless apparatus, in addition to the plurality of proximal wireless apparatus via the wireless wide area network. Accordingly, each of the local area network devices, namely the proximal wireless apparatus receive via their wireless wide area network transceivers, receive blocks of information which is the same information sent to all the proximal wireless apparatus as well as the destination unit. This simultaneous transmission of the same information for the destination unit that is sent and similarly received by the plurality of proximal wireless units is represented as transmission 808. As shown in block 914, the multiple (or only one if desired) proximal wireless apparatus receive the same information from the wide area network via their wide area network transceivers. As shown in block 916, the method includes forwarding of information based on the received information, via the local area network, by each proximal apparatus to the destination using their wireless local area network transceivers. The forwarding of the information that was received by each of the proximal wireless apparatus is forwarded by all of these units to the destination wireless apparatus so that the same information is received by the destination wireless apparatus. Suitable synchronization and coordination between all the proximal wireless apparatus using the local area network wireless scheme is done in a manner well known in the art. The forwarding of the information is shown by forwarding signals 810. The destination wireless apparatus then receives the retransmitted same information from all of the proximal wireless units and combines the forwarded information in an appropriate manner to enhance the quality of received information for the destination wireless apparatus. This is shown, for example, in block 918. This signal combining includes, for example, the destination wireless apparatus combining the forwarded information in a desired way using switched diversity combining, maximal ratio diversity combining, or any other suitable signal combining technique as desired.

It will be understood that an additional protocol can be used to manage the forwarding of information. For example, if one proximal unit receives the information adequately for decoding, it is the only proximal user that needs to forward information. Likewise, the destination can establish a protocol where it receives the best signal received from the proximal units first and continues receiving forwarded information only until it may successfully decode the information transmitted by the wide area system. A way of doing this is by the destination unit polling the proximal units for information about their reception and requesting the information sequentially from the proximal users in an order corresponding to decreasing received quality.

It will be recognized that as an alternative embodiment, a third party or non-destination wireless apparatus may receive the retransmitted same information from each of the proximal wireless units and perform the signal combining and then pass or resend a signal resulting signal from the combination to the destination wireless apparatus.

As shown in block 920, the destination wireless apparatus then sends an acknowledgment message 812 back to the wide area network base station indicating that it has received the first block of traffic data information. In response to the acknowledgment message 812, the wide area network base station then sends a second block of information via message 814, to the same destination and proximal wireless units.

As shown in block 922, the method may be enhanced by suitable power control techniques. Accordingly, the method includes determining, by the wide area network (e.g., the base station or other network element), if power control is suitable before the next block of information is sent. This may be done using conventional mechanisms by analyzing, for example, the signal strength of control message information sent by each of the proximal wireless units via their wide area network transceivers.

Alternatively, a power control message can be transmitted by the destination unit along with the acknowledgement message. This power control message is determined based on the adequacy of reception of the combined capabilities of the destination and proximal units. By minimizing the power that the wide area system needs to successfully transfer traffic data to the destination unit, as augmented by the reception capabilities of the proximal units, the capacity and performance of the wide area downlink system is improved.

As shown in block 924, the method includes receiving the next block of information by each of the plurality of proximal wireless units. The process then repeats and continues until the entire stream of traffic data that is destined for the destined wireless apparatus is transferred.

The aggregated proximal wireless apparatus can be used to communicate in the opposite direction, the uplink direction, to communicate information in the transmit direction also. For example, a wireless apparatus that is used to transmit information to the wide area network cellular system, sends the same information to at least one other member of the aggregated group, which subsequently also transmits the same information to the wide area network. In this embodiment, the method includes transmitting the same information by a wireless apparatus (e.g., a source wireless apparatus) to at least one proximal wireless apparatus via the wireless local area network. The same information is then retransmitted via a wireless wide area network channel(s), by the wireless apparatus and by the proximal wireless apparatus (or multiple apparatus). The wide area network base station then receives the retransmitted same information from each of the wireless apparatus and at least one proximal wireless apparatus and uses the received retransmitted same information from both devices to enhance the quality of received information for the wireless apparatus.

The uplink multiple wireless apparatus outlined can use different assigned Walsh codes or the same code if desired. This information is negotiated in a similar way amongst the destination and proximal units. If the same code is used, the subscriber may be synchronized in time and the base station is programmed to perceive the information as multi-path information and combines the multipath signals in a RAKE receiver, or any other suitable receiver. If the information is sent on different codes by the proximal wireless units, the output is received by different RAKE receivers and combined, realizing diversity improvement.

As previously discussed with reference to FIGS. 8 and 9, the method for using different code/channel assignments includes receiving said assignment information by the wireless apparatus via the wide area network for the plurality of proximal wireless apparatus to be used in the aggregated group. The source wireless apparatus then again conveys the received channel assignment information to the plurality of proximal wireless apparatus to facilitate retransmission of the same information to the wide area network via the wide area network transceivers in each of the wireless apparatus in the group. Accordingly, a common network element, such as the wide area network base station, receives the same information encoded with different CDMA codes and receives the retransmitted same information from each of the wireless apparatus and the proximal wireless apparatus using the plurality of RAKE receivers. All these received signals are then optimally combined to improve reception. Power control information may additional be communicated and utilized.

As described herein, and as previously noted, each of the wireless apparatus may include a wireless wide area network transceiver and a wireless local area network transceiver along with a processing device that is operatively coupled to the wireless wide area network transceiver and to the wireless local area network transceivers wherein the processing device is operative to perform the above-identified operations. Accordingly, the processing devices may be programmed with executable instructions that when executed cause the processing device or devices to perform the operations described herein. As used herein, processing device includes one or more processing devices.

The afore-described system allows subscriber devices, to beneficially receive distributed information which is the same information forwarded by a plurality of proximal wireless units. A destination wireless apparatus may then suitably combine the signals to get an improved signal quality. In addition, a base station or other suitable network element may beneficially combine multiple subscriber information sent on different codes to obtain a diversity benefit. Other advantages will be recognized by those having ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the broad scope of the basic underlying principles disclosed and claimed herein.

What is claimed is:

1. A method for communicating information for a wireless apparatus in communication with a proximal wireless unit via a first wireless communication system and also in communication with a second wireless communication system, the method comprising:
   determining whether the wireless apparatus will allow shared use of its wireless resources with the proximal wireless unit; and
   providing a reward for allowing the shared use of the wireless apparatus shared resources;
   wherein the first wireless communication system includes a short range wireless local area network and wherein the second wireless communication system includes a wireless wide area network and including the step of generating a user record identifying a type of reward that is provided in response to enabling the wireless apparatus to act as a shared wireless resource.

2. The method of claim 1 wherein the step of determining whether the wireless apparatus will allow shared use of its wireless resources with proximal wireless units includes receiving data representing whether a user desires to participate in allowing the wireless apparatus to share its wireless resources.

3. The method of claim 2 including presenting a user input interface having a selection menu to generate the data representing whether a user desires to participate in allowing the wireless apparatus to share its wireless resources.

4. The method of claim 3 including the step of enabling the wireless apparatus to share its wireless resources in response to the data representing whether a user desires to participate in allowing the wireless apparatus to share its wireless resources.

5. The method of claim 2 including the step of locating the proximal wireless units in response to determining that the wireless apparatus is designated as a shared wireless resource.

6. The method of claim 1, wherein the local area network includes a radio frequency LAN wherein a communication range is less than one-hundred meters and wherein the WAN includes a digital radio frequency cellular communication system.

7. The method of claim 1 comprising:
   generating a message for the second wireless system indicating that the wireless apparatus will allow sharing of the first wireless communication resources with the proximal wireless unit wherein the first wireless communication system resources comprise short range wireless communication resources.

8. A method for communicating information for a wireless apparatus in communication with a proximal wireless unit via a first wireless communication system and also in communication with a second wireless communication system, the method comprising:
   determining whether the wireless apparatus will allow shared use of its wireless resources with the proximal wireless unit; and
   providing a reward for allowing the shared use of the wireless apparatus shared resources
   receiving data representing whether a user desires to participate in allowing the wireless apparatus to share its wireless resources;
   generating a first message, in response to receiving the data, for a proximal wireless unit in the first wireless communication system, indicating an amount of bandwidth that the wireless apparatus can share with proximal wireless units;
   generating a second message, in response to receiving the data, for the second wireless communication system indicating that the wireless apparatus is allowing shared use of its wireless resources by proximal wireless units.

9. The method of claim 1 wherein the first wireless communication system is a local area network and includes an optical local area network.

10. The method of claim 1 wherein the step of providing a reward for allowing the shared use of the wireless apparatus shared resources includes at least one of: providing a credit amount to an associated user account, providing free use of wireless channels; providing a reduced price structure for the user and updating a subscriber billing system in response to enabling a shared resource feature.

11. A method for communicating information comprising:
   receiving data representing whether a user desires to participate in allowing a wireless apparatus to share its wireless resources with proximal wireless units;
   determining whether the wireless apparatus will allow shared use of its wireless resources with proximal wireless units that are in a wireless local area network;
   enabling the wireless apparatus to share its wireless resources in response to the data representing whether a user desires to participate in allowing the wireless apparatus to share its wireless resources;
   generating a first message, in response to receiving the data, for a plurality of proximal wireless units in the first wireless communication system, indicating an amount of bandwidth that the wireless apparatus can share with the plurality of proximal wireless units; and
   generating a second message, in response to receiving the data, for the second wireless communication system indicating that the wireless apparatus is allowing shared use of its wireless resources by proximal wireless units.

12. The method of claim 11 including the step of presenting a user input interface having a selection menu to generate the data representing whether a user desires to participate in allowing the wireless apparatus to share its wireless resources.

13. The method of claim 11 including the step of discovering the proximal wireless units in response to determining that the wireless apparatus is designated as a shared wireless resource.

14. A method for communicating information for a wireless apparatus in communication with a first wireless communication system and also in communication with a second wireless communication system, the method comprising:
   determining whether the wireless apparatus will allow shared use of its wireless resources with proximal wireless units;
   providing a reward for allowing the shared use of the wireless apparatus shared resources; and
   wherein the first wireless communication system includes a short range wireless local area network and wherein the second wireless communication system includes a wireless wide area network and including the step of generating a user record identifying a type of reward that is provided in response to enabling the wireless apparatus to act as a shared wireless resource.

15. A method for communicating information for a wireless apparatus in communication with a first wireless communication system and also in communication with a second wireless communication system, the method comprising:
   determining whether the wireless apparatus will allow shared use of its wireless resources with proximal wireless units;

providing a reward for allowing the shared use of the wireless apparatus shared resource;
receiving data representing whether a user desires to participate in allowing the wireless apparatus to share its wireless resources;
generating a first message, in response to receiving the data, for a proximal wireless unit in the first wireless communication system, indicating an amount of bandwidth that the wireless apparatus can share with proximal wireless units; and
generating a second message, in response to receiving the data, for the second wireless communication system indicating that the wireless apparatus is allowing shared use of its wireless resources by proximal wireless units.

* * * * *